United States Patent Office 3,715,359
Patented Feb. 6, 1973

3,715,359
HYDROXYLATED ACRONYCINE
Hugh R. Sullivan, Indianapolis, Ind., and Ruth E. Billings, Minneapolis, Minn., assignors to Eli Lilly and Company, Indianapolis, Ind.
No Drawing. Continuation-in-part of application Ser. No. 841,155, July 11, 1969. This application July 2, 1971, Ser. No. 159,563
Int. Cl. C07d 37/16
U.S. Cl. 260—279 R
7 Claims

ABSTRACT OF THE DISCLOSURE

Hydroxylated derivatives of acronycine, useful as antimicrobial agents.

CROSS-REFERENCE

This application is a continuation-in-part of our previously filed application, Ser. No. 841,155, filed July 11, 1969, now abandoned.

BACKGROUND OF THE INVENTION

Acronycine is an alkaloid isolated from the bark of *Acronychia baueri* [Nature 162, 223 (1948) and Aust. J. Sci. Res. 2A, 423 (1949)]. The structure of acronycine was determined by MacDonald and Robertson, Aust. J. Chem. 19, 275 (1966) and by Govindachari, Pai and Subramaniam, Tetrahedron 22, 3245 (1966). Svoboda and coworkers have disclosed the activity of acronycine against transplanted tumors [J. Pharm. Sci. 55, 758 (1968) and Lloydia 29, 206 (1966)].

SUMMARY

This invention provides novel hydroxylated acronycines of the following structure:

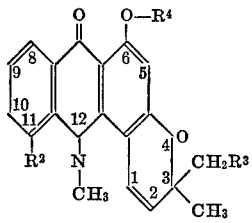

wherein, $R^1$, $R^2$, $R^3$ are hydrogen or hydroxyl, at least one of $R^1$, $R^2$, $R^3$ being hydroxyl and $R^4$ is hydrogen or methyl.

In the above formula, if $R^1$, $R^2$ and $R^3$ are hydrogen and $R^4$ is methyl, the compound is acronycine whose systematic name is 3,12 - dihydro - 6-methoxy-3,3,12-trimethyl-7H-pyrano[2,3-c] acridin-7-one. This invention provides acronycine or 6-desmethylacronycine substituted with an hydroxyl group in the 9 position ($R^1$), 11 position ($R^2$), or in one of the methyl groups at the 3 position ($R^3$) or combinations having hydroxyl groups at 9 and 11, 9 and 3, etc., to yield an acronycine or 6-desmethylacronycine derivative having 2 or 3 hydroxyl groups. Compounds coming within the scope of this invention as named systematically include the following:

3,12-dihydro-11-hydroxy-3-hydroxymethyl-6-methoxy-3,12-dimethyl-7H-pyrano[2,3-c]acridin-7-one,
3,12-dihydro-9-hydroxy-6-methoxy-3,3,12-trimethyl-7H-pyrano[2,3-c]acridin-7-one,
3,12-dihydro-11-hydroxy-6-methoxy-3,3,12-trimethyl-7H-pyrano[2,3-c]acridin-7-one,
3,12-dihydro-9,11-dihydroxy-6-methoxy-3,3,12-trimethyl-7H-pyrano[2,3-c]acridin-7-one,
3,12-dihydro-6,11-dihydroxy-3,3,12-trimethyl-7H-pyrano[2,3-c]acridin-7-one,
3,12-dihydro-3-hydroxymethyl-6-methoxy-3,12-dimethyl-7H-pyrano[2,3-c]acridin-7-one,
3,12-dihydro-9,11-dihydroxy-3-hydroxymethyl-6-methoxy-3,12-dimethyl-7H-pyrano[2,3-c]acridin-7-one,
3,12-dihydro-9-hydroxy-3-hydroxymethyl-6-methoxy-3,12-dimethyl-7H-pyrano[2,3-c]acridin-7-one,
and 3,12-dihydro-6,9-dihydroxy-3,3,12-trimethyl-7H-pyrano[2,3-c]acridin-7-one.

The compounds of this invention can be isolated from the urine or bile of mammals to whom acronycine has been administered intra-peritoneally or orally and are presumably formed by the action of certain enzyme systems on the acronycine molecule. Those compounds carrying a hydroxyl group in either the 9 or 11 position or both of acronycine can also be synthesized by following the method of Beck et al., J. Am. Chem. Soc. 89, 3934 (1967). Adapting this procedure to the synthesis of some of the compounds of this invention, a 5,7-di-loweralkoxy-3,4-dihydrocarbostyril can be reacted with a 2-halo-3(or 5-benzyloxybenzoic acid under Ullmann conditions to yield a substituted carbostyril which is in turn cyclized with polyphosphoric acid to yield a 3-(1,3-dialkoxy-5(or 7)-benzyloxy-9-oxo-4-acridanyl)propionic acid. Esterification of the acid group followed by reaction with methyl lithium yields the corresponding tertiary alcohol. Treatment of this latter compound with acid followed by N-methylation, selective O-alkylation and oxidation with DDQ yields the desired 9-(or 11)-benzyloxy acronycine derivative which can be readily debenzylated to give the 9-(or 11)-hydroxy acronycine of this invention. Similarly, the procedure of Kwok and Pohland, J. Am. Chem. Soc. 90, 4706 (1968) can be adapted to produce intermediates which are readily convertible into the corresponding acronycine derivative. The intermediates are prepared by employing a 2-halo-3(or 5)-benzyloxybenzoic acid in the Ullman condensation with, in this instance, a 5-(2-carboxyanilino)chroman. The resulting product is again debenzylated in order to provide hydroxy compounds according to the above formula.

Compounds in which $R^4$ is hydrogen are readily prepared by chemical or enzymatic demethylation of the corresponding compound in which $R^4$ is methyl.

9-hydroxyacronycine can also be prepared via microbiological conversion of acronycine using *Aspergillus alleaceus*.

The compounds of this invention are useful as microbiocidal agents. They are particularly effective against algae but, being phenols, are also active against a broad spectrum of bacteria. For use as microbiocidal agents, the compounds are formulated in the form of salts in an aqueous medium, preferably employing a surface active agent to aid in obtaining better adherence of the solution to various surfaces which it is desired to decontaminate. When employed as algaecides, the compounds of this invention are formulated as before and simply added to the body of water wherein it is desirable to control the growth of algae.

The preparation of the compounds of this invention is illustrated by the following specific example:

Rats are administered acronycine by the intraperitoneal route. Their common bile ducts are then cannulated and about 15 ml. of bile collected from each rat. The bile is pooled and hydrolyzed overnight at about 37° C. with an enzyme mixture containing both glucuronidase and sulfatase at pH=5.0. The hydrolyzed mixture is extracted 3 times with an equal volume of ethyl acetate. The ethyl acetate extracts are combined and evaporated to dryness in vacuo. The resulting residue is chromatographed on silica G.F. using a 85:10:5 ethyl acetate-methanol-diethylamine system as the eluant.

Following the above procedure six components were obtained including acronycine. These components had the following $R_f$ values:

| Compound name: | $R_f$ value |
|---|---|
| Acronycine | .89 |
| 3,12-dihydro - 11 - hydroxy - 6 - methoxy-3,3,12-trimethyl-7H-pyrano[2,3-c]acridin-7-one | .55 |
| 3,12-dihydro - 9 - hydroxy - 6 - methoxy-3,3,12-trimethyl-7H-pyrano[2,3-c]acridin-7-one | .41 |
| 3,12-dihydro - 9,11-dihydroxy-6-methoxy-3,3,12-trimethyl-7H-pyrano[2,3-c]acridin-7-one | .00 |
| 3,12 - dihydro - 3 - hydroxylmethyl-6-methoxy-3,12 - dimethyl - 7H - pyrano[2,3-c]acridin-7-one | .71 |
| 3,12 - dihydro - 11 - hydroxy-3-hydroxymethyl-6-methoxy - 3,12 - dimethyl-7H-pyrano[2,3-c]acridin-7-one | .30 |

The compounds were also identified by mass spectrographic means wherein each component obtained in the above chromatographic separation was identified in the mass spectrograph by comparison with acronycine and/or was reacted with diazomethane to form the corresponding methyl or dimethyl ether and the ethers themselves compared in the mass spectrograph with acronycine.

When acronycine was administered to humans, the compounds 3,12-dihydro-9-hydroxy-6-methoxy-3,3,12-trimethyl-7H-pyrano[2,3-c]acridin-7-one;
3,12-dihydro-11 hydroxy-6-methoxy-3,3,12-trimethyl-7H-pyrano[2,3-c]acridin-7-one; and
3,12-dihydro-11-hydroxy-3-hydroxymethyl-6-methoxy-3,12-dimethyl-7H-pyrano[2,3-c]acridin-7-one were isolated from pooled human urine. Sufficient compound was obtained in each case to further confirm the assigned structure by means of the nuclear magnetic resonance spectrum.

Guinea pigs to whom acronycine was administered intraperitoneally also produced a further compound in which the methoxyl in the 6th position of acronycine was converted to a hydroxyl group. This compound 3,12-dihydro-6,11-dihydroxy - 3,3,12 - trimethyl - 7H - pyrano[2,3-c] acridin-7-one ($R_f$=.50) can also be prepared by chemical demethylation of 3,12-dihydro-11-hydroxy-6-methoxy-3,3,12-trimethyl-7H-pyrano[2,3-c]acridin-7-one or can be produced by varying either the methods of Beck et al. or Kwok et al. referred to above to yield a 6-hydroxyl compound.

Production of 9-hydroxyacronycine (3,12-dihydro-9-hydroxy-6-methoxy - 3,3,12 - trimethyl - 7H - pyrano[2,3-c] acridin-7-one) by incubation with an *Aspergillus alleaceus* culture is carried out as follows: A culture of *Aspergillus alleaceus* was inoculated with a culture medium containing, per liter, 15 g. of corn meal, 10 g. of sucrose, 5 g. of yeast extract, 10 g. of enzymatic hydrolysate of soybean meal, 2 g. of magnesium sulfate heptahydrate, 3 g. of potassium chloride and 2 g. of potassium monohydrogen phosphate and grown therein for 48 hours. Acronycine was added to the culture medium containing the actively metabolizing culture and incubated therein for another 72 hours. The cells and broth were separated and each extracted with chloroform. The broth extracts contained a mixture of 9-hydroxy acronycine and desmethylacronycine. Treatment of this extract with diazomethane converted the desmethylacronycine to acronycine from which 9-hydroxyacronycine was readily separated by chromatography over silica gel.

We claim:
1. A compound having the structure

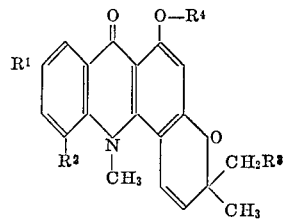

wherein, $R^1$, $R^2$, $R^3$ are hydrogen or hydroxyl, at least one of $R^1$, $R^2$, $R^3$ being hydroxyl and $R^4$ is hydrogen or methyl.

2. The compound according to claim 1, said compound being 3,12-dihydro-11-hydroxy - 3 - hydroxymethyl-6-methoxy-3,12-dimethyl-7H-pyrano[2,3-c]acridin-7-one.

3. The compound according to claim 1, said compound being 3,12-dihydro-9-hydroxy-6-methoxy-3,3,12-trimethyl-7H-pyrano[2,3-c]acridin-7-one.

4. The compound according to claim 1, said compound being 3,12 - dihydro - 11 - hydroxy-6-methoxy-3,3,12-trimethyl-7H-pyrano[2,3-c]acridin-7-one.

5. The compound according to claim 1, said compound being 3,12-dihydro-9,11-dihydroxy - 6 - methoxy-3,3,12-trimethyl-7H-pyrano[2,3-c]acridin-7-one.

6. The compound according to claim 1, said compound being 3,12 - dihydro-6,11-dihydroxy-3,3,12-trimethyl-7H-pyrano[2,3-c]acridin-7-one.

7. The compound according to claim 1, said compound being 3,12-dihydro - 3 - hydroxylmethyl-6-methoxy-3,12-dimethyl-7H-pyrano[2,3-c]acridin-7-one.

References Cited
UNITED STATES PATENTS

| 3,657,249 | 4/1972 | Boohen | 260—279 |
| 3,673,163 | 6/1972 | Walkling | 260—279 |
| 3,624,087 | 11/1971 | Beck | 260—279 |

OTHER REFERENCES

Chem. and Eng. News, Dec. 12, 1966, pp. 64–5.

DONALD G. DAUS, Primary Examiner

U.S. Cl. X.R.

195—51; 424—257

PO-1050
(5/69)

UNITED STATES PATENT OFFICE
CERTIFICATE OF CORRECTION

Patent No. __3,715,359__    Dated __February 6, 1973__

Inventor(s) __Hugh R. Sullivan and Ruth E. Billings__

It is certified that error appears in the above-identified patent and that said Letters Patent are hereby corrected as shown below:

In column 1, lines 36-45, the $R^1$ was left off the formula and should read as follows:

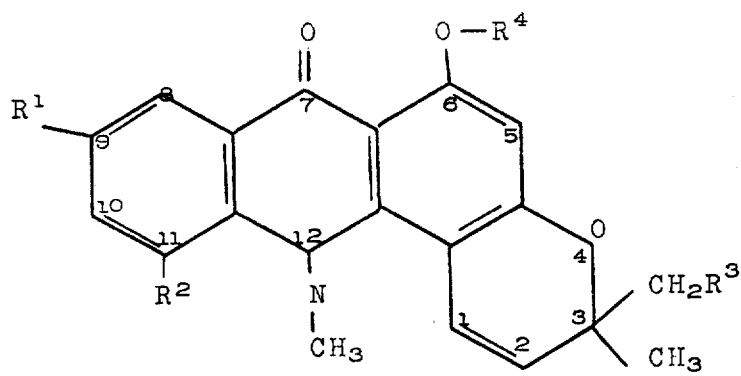

In column 4, claim 1, the $R^1$ was not attached to the structure and should read as follows:

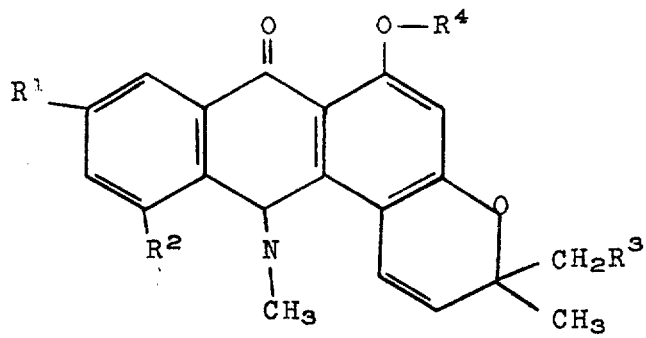

Signed and sealed this 19th day of March 1974.

(SEAL)
Attest:

EDWARD M. FLETCHER, JR.
Attesting Officer

C. MARSHALL DANN
Commissioner of Patents